United States Patent

[11] 3,603,596

[72] Inventor George H. Eash
3546 Alginet Drive, Encino, Calif. 91316
[21] Appl. No. 873,340
[22] Filed Nov. 3, 1969
[45] Patented Sept. 7, 1971

[54] CARTRIDGE-RETAINING MECHANISM FOR TAPE DECKS AND THE LIKE

3 Claims, 6 Drawing Figs.

[52] U.S. Cl. .......... 274/4 B, 226/174
[51] Int. Cl. .......... G11b 5/00
[50] Field of Search .......... 179/100.2 Z; 274/11, 4; 242/55.19 F; 226/179, 180, 174

[56] References Cited

UNITED STATES PATENTS

| | | | |
|---|---|---|---|
| 3,485,500 | 12/1969 | Loeschner et al. .......... | 274/11 B |
| 3,482,792 | 12/1969 | Auld .......... | 274/11 B |

*Primary Examiner*—Richard A. Schacher
*Assistant Examiner*—Gene A. Church
*Attorneys*—Paul L. Gardner and Kendrick & Subkow ABSTRACT: An improved cartridge-retaining mechanism for magnetic tape decks (i.e., players and transcribers) and the like is actuated automatically by the insertion of a magnetic tape cartridge into the cartridge-receiving slot of the deck. A lever arm swingably mounted (e. g., pivotably or rotatably mounted) beneath the cartridge-receiving slot of the deck carries an actuator finger which normally extends into the cartridge receiving slot, and a cartridge-retaining finger which is normally disposed below the slot. Insertion of a tape cartridge into the slot moves the actuator finger forwardly to overcome the force of an over-the-center-type control spring and bring the cartridge-retaining finger upwardly into the cartridge-receiving slot where it engages the underside of the cartridge. Thereafter, the control spring urges the cartridge-retaining finger forwardly to press the pinch roller and the tape in the cartridge against the drive capstan on the deck.

INVENTOR
GEORGE H. EASH

BY KENDRICK and SUBKOW
Paul L. Gardner
ATTORNEYS

INVENTOR
GEORGE H. EASH
BY KENDRICK and SUBKOW
Paul L. Gardner
ATTORNEYS

CARTRIDGE-RETAINING MECHANISM FOR TAPE DECKS AND THE LIKE

BACKGROUND OF THE INVENTION

The present invention relates to an improved cartridge-retaining mechanism for maintaining a tape cartridge in place on a tape deck with the pinch roller and tape in the cartridge pressed against the drive capstan on the deck.

In recent years tape decks which receive magnetic tape cartridges have become increasingly popular throughout the world. The popularity of these cartridges and decks may be attributed, in part, to the effortless manner in which the cartridge is loaded in the deck and removed therefrom. A magnetic tape cartridge comprises a magnetic tape encased in a relatively compact cartridge having cutout portions along the forward edge thereof which expose portions of the tape. The cartridge is played by simply inserting it into a slot provided in the deck, and turning the instrument on. A transducer head (e.g., a magnetic pickup head or transcriber) on the deck is positioned to extend through one of the cutout portions in the cartridge to pick up or record magnetic signals on the tape, and a drive capstan is also positioned on the deck to extend through a second cutout portion in the cartridge and cooperate with a pinch roller in the cartridge to drive or move the tape past the transducer head. Tape decks and cartridges of the type described above are shown, for example, in U.S. Pat. Nos. 2,778,880 and 3,350,025.

In order to insure that the tape in the cartridge is effectively driven by the drive capstan, it is necessary to provide some means for positively urging the pinch roller in the cartridge against the capstan. This may be accomplished by a manually actuated lever which engages a slot in the bottom surface of the cartridge and urges it forwardly to press the pinch roller against the drive capstan, as shown in U.S. Pat. No. 2,778,880. Although such an arrangement effectively pressed the pinch roller and tape against the drive capstan, and may effectively accept cartridges of various sizes, it is necessary to manually actuate the cartridge retaining lever.

U.S. Pat. No. 3,350,025 discloses a tape deck employing a spring-biased roller which engages a notch in the cartridge when the cartridge is inserted into the deck. The roller urges the cartridge laterally and forwardly to press the cartridge against one of the cartridge side guides and the capstan. The lateral force of the spring-biased roller is wasted, and must be overcome when the cartridge is inserted into the deck. Moreover, since the spring-biased roller presses the cartridge laterally against one of the cartridge side guides on the deck, the deck is not adapted to accommodate cartridges of varying widths.

SUMMARY OF THE INVENTION

In view of the foregoing, it is an object of the present invention to provide an improved cartridge-retaining mechanism for tape decks and the like which is not subject to the deficiencies discussed above.

The foregoing and other objects have been realized by the improved cartridge-retaining mechanism of the present invention which comprises a lever arm swingably (e.g., pivotably or rotatably) mounted beneath the cartridge-receiving slot in the tape deck. The lever carries a cartridge-retaining member which is normally disposed outside of the cartridge-receiving slot in the tape deck, and an actuating member which normally extends into the cartridge-receiving slot so as to be engaged and moved by a cartridge inserted into the slot. Biasing means (e.g., an over-the-center spring mechanism) normally urges the lever arm to an inoperative position and is operative, in response to movement of the actuator member, to swing the lever arm to a cartridge-retaining position wherein the cartridge-retaining member moves into the cartridge-retaining slot and biases the cartridge forwardly.

BRIEF DESCRIPTION OF HE DRAWINGS

DETAILED DESCRIPTION OF PREFERRED EMBODIMENTS

Figure 1:
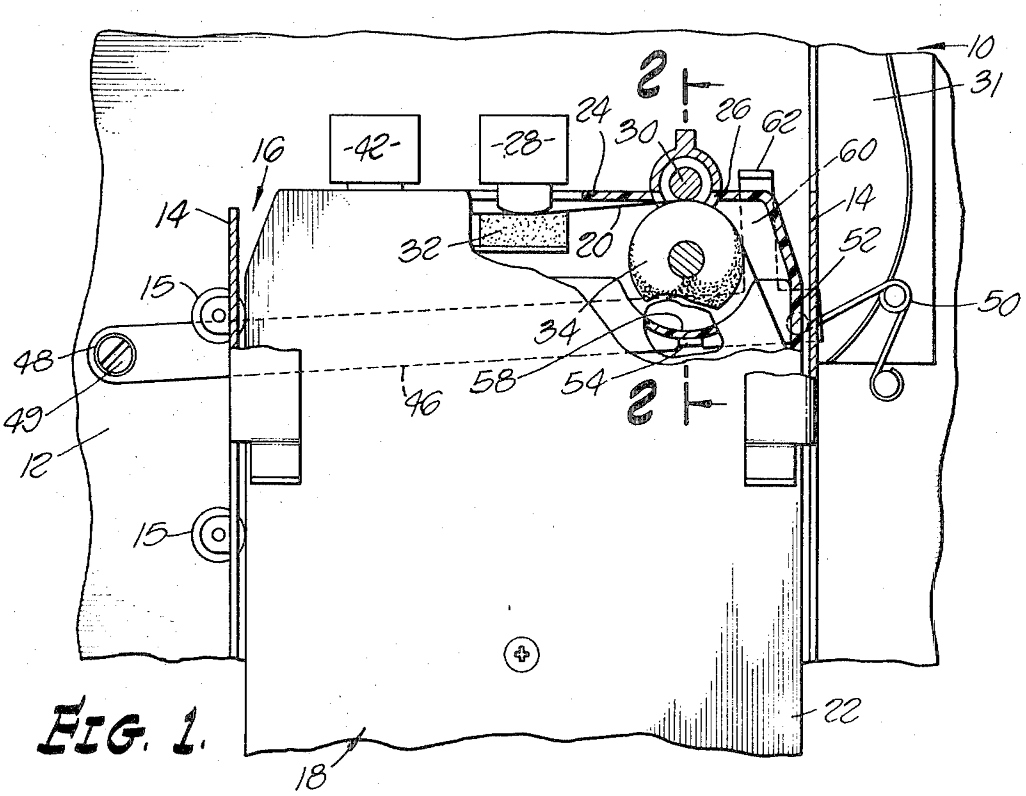
FIG. 1 is a top plan view, partly in secton, showing a preferred embodiment of a cartridge-retaining mechanism of the present invention being employed to maintain a magnetic tape cartridge in place in a tape deck.
Figure 2:
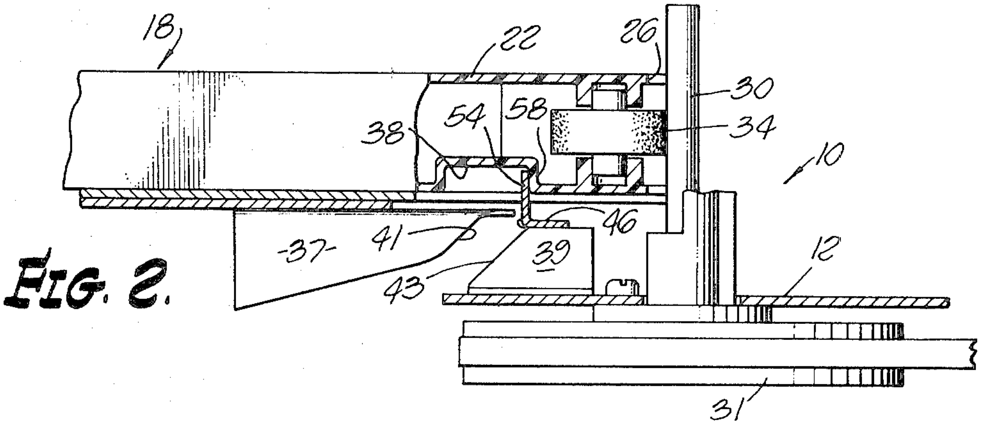
FIG. 2 is a sectional side elevation view taken along the line 2—2 of FIG. 1.
Figure 3:
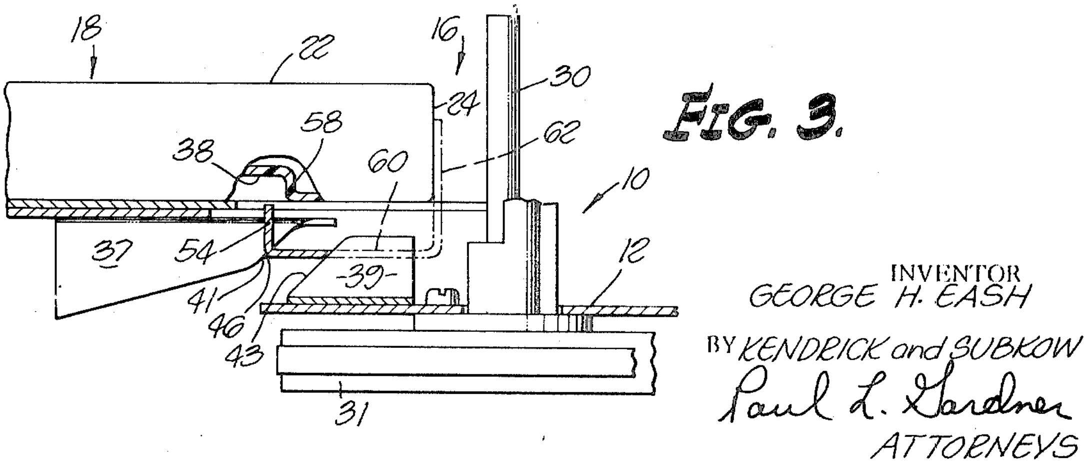
FIG. 3 is a fragmentary side elevation view, partly in section, showing the cartridge-retaining mechanism of FIG. 1 as the cartridge is being inserted into the tape deck.

The tape deck 10 in FIGS. 1–3 includes a chassis 12 having a pair of substantially parallel, spaced guide flanges or rails 14, 14 mounted thereon. The guides 14, 14 define a cartridge-receiving zone or slot 6 adapted to receive a magnetic tape cartridge 18. One of the guides is provided with rollers 15, 15 to facilitate insertion of a cartridge.

The cartridge 18 comprises a magnetic tape 20, conventional per se, encased in a plastic container 22. The forward edge 24 of the cartridge 18 has cutout portions 24 and 26 therein through which a magnetic transducer head 28 (i.e., a magnetic pickup head or transcriber) and a drive capstan 30 mounted on the chassis 12 are designed to extend when the cartridge is fully inserted into the slot 16. The drive capstan 30 is driven by a suitable motor (not shown) through a pulley 31 to drive the tape 20 past the transducer head 28.

A resilient pad 32 in the cartridge 18 gently presses the tape 20 against the head 28, and a pinch roller 34 adjacent the pad 32 presses the tape 20 against the drive capstan 30.

As best shown in FIGS. 2 and 3, the bottom of the cartridge 18 is provided with a recessed portion 38 behind the pinch roller 34, which recess is adapted to be engaged by the cartridge retaining mechanism of the present invention in a manner described in detail below.

Also mounted on the chassis 12 adjacent the forward end portion of the cartridge-receiving slot 16 is a stop member 42 which limits forward movement of cartridges inserted into the slot.

As best shown in FIGS. 2 and 3, a pair of flanges 37, 39 having cam surfaces 41, 43, respectively, are mounted on the chassis 12 beneath the cartridge-receiving slot 16. These cam surfaces 41, 43 cooperate with the cartridge-retaining mechanism, in a manner described in detail below, to guide movement of the cartridge-retaining mechanism between its normal, inactive position (FIG. 3) and its cartridge-retaining position (FIG. 2).

The cartridge-retaining mechanism on the tape deck 10 comprises a lever arm 46 having one end 48 pivotably connected to the chassis 12 by a pivot pin 49. An over-the-center-type spring 50 is connected between the other end 52 of the lever arm and the chassis. A cartridge-retaining finger 54 in the form of an integral, upstanding flange, is provided on the lever arm 46 so as to selectively engage the forward wall 58 of the recess 38 in the bottom of a tape cartridge 18 to be played (best shown in FIG. 2). Also integrally connected to the lever arm 46 is a leg 60 extending at approximately a right angle thereto and having its outer end upturned to form an actuator finger or flange 62. As best shown in FIG. 3, the actuator finger 62 is longer than the cartridge-retaining finger 54, so that when the lever arm 46 is in its normal, inactive position (FIG. 3), the actuator finger 62 extends into the cartridge-receiving slot 16, but the cartridge-retaining finger 54 does not.

The cartridge-retaining mechanism of the tape deck 10 shown in FIGS. 1–3 operates in the following manner. Normally, prior to the insertion of a tape cartridge 18 into the cartridge-receiving slot 16, the lever arm 46 is urged to its inactive position (FIG. 3) by the spring 50. In this normal position, the actuator finger 62 extends upwardly into the cartridge-receiving slot 16, but the cartridge-retaining finger 54 is disposed below the slot, as shown in FIG. 3.

When a tape cartridge 18 is inserted into the slot 16, the forward end 24 thereof will first come into contact with the actuator finger 62, as shown in FIG. 3. Further forward movement of the cartridge will pivot the lever arm 46 forwardly about pivot pin 49. As the lever arm 46 moves forwardly, the cam surface 43 (FIGS. 2 and 3) will cam it upwardly, bringing the cartridge-retaining finger 54 into the recess 38 in the bottom surface of the cartridge. Thereafter, the over-the-center spring 50 will urge the lever arm 46 forwardly. The cartridge-retaining finger 54 will thereby be urged forwardly against the forward wall 58 of the recess 38 to press the pinch roller 34 and the tape 20 in the cartridge 18 against the drive capstan 30. With the pinch roller 34 and the tape 20 so pressed against the capstan 30, the capstan will effectively function to drive the tape past the transducer head 28.

After the tape 20 has been played, the cartridge 18 may be removed from the tape deck 10 by simply pulling it rearwardly out of the slot 16. As the cartridge is pulled rearwardly, the forward wall 58 of the recess 38 will force the cartridge-retaining finger 54 rearwardly, against the force of spring 50, to pivot the lever arm 46 rearwardly. As the lever arm moves rearwardly, the cam surface 41 will cam it downwardly to carry the cartridge-retaining finger 54 below the cartridge-receiving slot 16. Thereafter, the over-the-center spring 50 will urge the lever arm 46 rearwardly to its normal, inactive position (FIG. 3).

Figure 4:
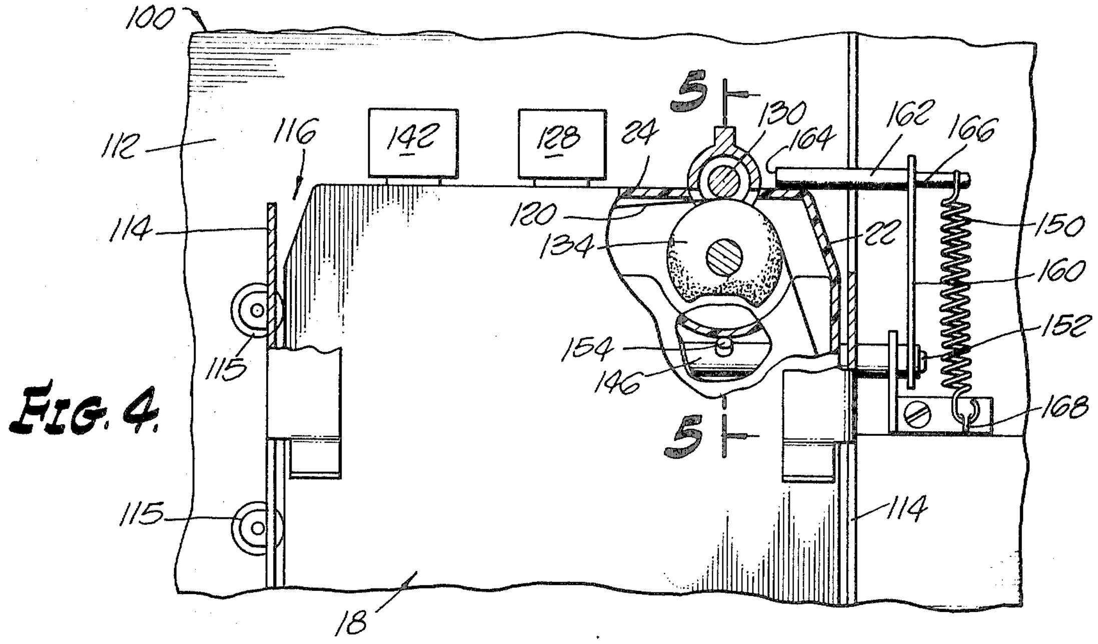
FIG. 4 is a top plan view of a second preferred embodiment of a cartridge-retaining mechanism of the present invention being employed to maintain a magnetic tape cartridge in place in a tape deck.
Figure 5:
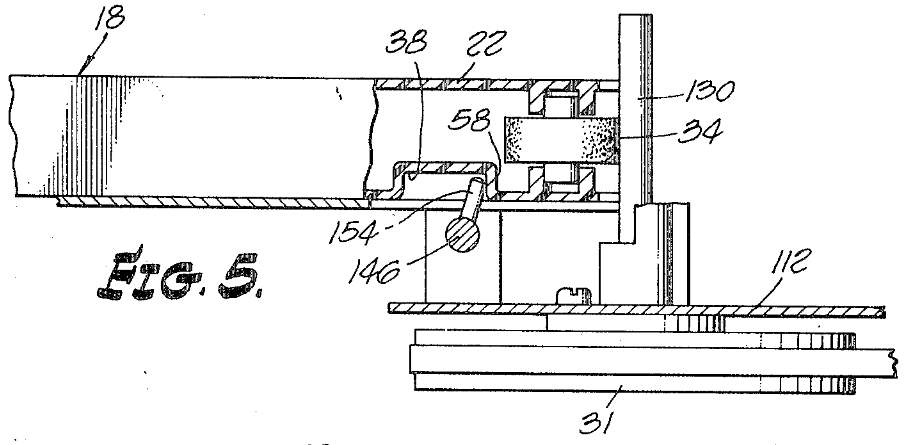
FIG. 5 is a sectional side elevation view taken along the line 5—5 of FIG. 4.
Figure 6:
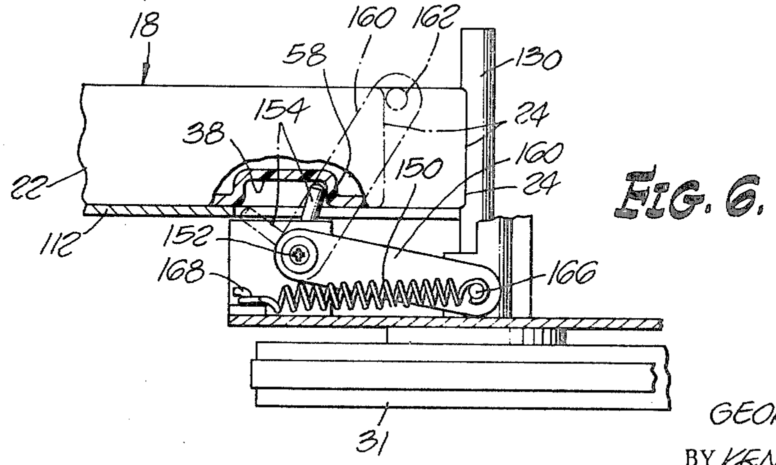
FIG. 6 is a fragmentary side elevation view, partly in section, showing the manner in which the cartridge-retaining mechanism of FIG. 4 operates.

The tape deck 100 shown in FIGS. 4–6 is virtually identical to the tape deck 10 of FIGS. 1–3, with the exception of the cartridge retaining mechanism. Thus, the chassis 112, cartridge guides 114, 114, drive capstan 130, transducer head 128, and stop member 142 of the tape deck 100 are virtually identical to the chassis 12, cartridge guides 14, 14, drive capstan 30, transducer head 28, and stop member 42 of the tape deck 10, respectively.

The cartridge-retaining mechanism of the tape deck 100 comprises a lever arm or shaft 146 rotatably mounted on the chassis 112. An upstanding cartridge-retaining finger 154 is mounted on the lever arm 146 in substantial alignment with the drive capstan 130, so as to be selectively movable into engagement with the recess 38 in the bottom of a tape cartridge 18. Mounted on one end 152 of the lever arm 146 is a radially extending flange 160 which carries an actuator finger 162 extending substantially parallel to the lever arm. One end 164 of the actuator finger 162 extends into the cartridge-receiving slot 116, while the other end 166 extends beyond the flange 160 and is connected to one end of an over-the-center spring 150. The other end of the spring 150 is connected to the chassis 112 at 168.

In use, the over-the-center spring 150 normally biases the lever shaft 146 to its inoperative position, shown in phantom lines in FIG. 6. In this normal, inoperative position, one end 164 of the actuator finger 162 extends into the cartridge-receiving slot 116 while the cartridge-retaining finger 154 is disposed bellow the slot 116.

When a cartridge 18 to be played is inserted into the slot 116, its forward end 24 initially comes into contact with the actuator finger 162, as shown in phantom lines in FIG. 6. Continued forward movement of the cartridge 18 urges the actuator finger 164 forwardly to rotate the flange 160 and shaft 146 in a clockwise direction, as viewed in FIGS. 5 and 6. As the shaft 146 rotates, the cartridge-retaining finger 154 will rotate upwardly and forwardly into the recess 38 in the bottom of the cartridge 18. Thereafter, the over-the-center spring 150 will act to urge the shaft 146 and cartridge-retaining finger 154 to the position shown in solid lines in FIGS. 4–6, wherein the cartridge-retaining finger 154 presses against the forward wall 58 of the cartridge recess 38 to urge the cartridge forwardly. This will press the pinch roller 34 and tape 20 against the drive capstan 130 to insure proper movement of the tape past the transducer head 128.

When the cartridge 18 is removed from the deck 100, the forward wall 58 of the recess 38 will push the cartridge-retaining finger 154 rearwardly, causing the shaft 146, the flange 160, and the actuator finger 162 to rotate in a counterclockwise direction, as viewed in FIGS. 5 and 6. Thereafter, the over-the-center spring 150 will act to urge the shaft 146 to its normal, inoperative position shown in phantom lines in FIG. 6.

As will be readily appreciated from the foregoing, when a cartridge is inserted into a tape deck incorporating a cartridge-retaining mechanism of the present invention, the retaining mechanism will automatically and effectively operate to press the pinch roller and tape in the cartridge against the drive capstan on the deck. It will also be appreciated that the tape deck incorporating a cartridge-retaining mechanism of the present invention is readily adapted to receive and play tape cartridges of various widths.

I claim:

1. An improved tape deck adapted to receive a magnetic tape cartridge having cutout portions in the front edge thereof exposing the tape to be played or transcribed upon; said tape deck comprising:

- a chassis, including a generally flat plate having upstanding guide flanges mounted thereon; said flat plate and said guide flanges defining a cartridge-receiving slot having a forward end portion;
- a transducer head mounted on said flat plate adjacent to the forward end portion of said cartridge-receiving slot;
- a drive capstan mounted on said plate adjacent to said transducer head in the forward end portion of said cartridge-receiving slot for cooperating with a pinch roller in a cartridge inserted into said cartridge-receiving slot to drive the tape in the cartridge past said transducer head; and
- an improved cartridge-retaining mechanism mounted on said chassis for engaging a cartridge inserted into said cartridge-retaining slot and urging such cartridge forwardly to press the pinch roller and the tape therein against said drive capstan; said improved retaining mechanism comprising:
- a lever arm mounted on said chassis beneath said flat plate; said lever arm having one end pivotally connected to said chassis and a free end spaced therefrom;
- a spring member connected between said chassis and said free end of said lever arm;
- said spring member normally biasing said lever arm to a rearward position; said spring member being operative, in response to forward movement of said lever arm through a predetermined distance, to bias said lever arm toward a forward, cartridge-retaining position;
- a pair of cam surfaces mounted on said chassis in operative relationship to said lever arm for causing said lever arm to move upwardly as it is moved forwardly, and to move downwardly as it is moved rearwardly;
- an upstanding, cartridge-retaining flange mounted on said lever arm;
- an actuator flange mounted on said lever arm and spaced forwardly from said cartridge-retaining flange;
- means defining an opening in said flat plate of said chassis;
- said actuator flange extending upwardly through said opening in said flat plate and into said cartridge-receiving slot;
- said cartridge-retaining flange being disposed beneath said flat plate and outside of said cartridge-receiving slot when said lever arm is in its normal, rearward position;
- said actuator flange being adapted to be engaged by a cartridge inserted into said cartridge-receiving slot to move said lever arm forwardly and upwardly, thereby moving said cartrige-retaining flange forwardly and upwardly through said opening in said flat plate to engage an abutment on the underside of the cartridge; whereupon said spring member will urge said lever arm forwardly to its retaining position wherein said cartridge-retaining flange urges the cartridge forwardly in said cartridge-receiving slot to urge the pinch roller and tape in the cartridge against said drive capstan.

2. An improved tape deck adapted to receive a magnetic tape cartridge having cutout portions in the front edge thereof exposing the tape to be played or transcribed upon; said tape deck comprising:

a chassis, including a generally flat plate having upstanding guide flanges mounted thereon; said flat plate and said guide flanges defining a cartridge-receiving slot having a forward end portion;

a transducer head mounted on said flat plate adjacent the forward end portion of said cartridge-receiving slot;

a drive capstan mounted on said plate adjacent to said transducer head in the forward end portion of said cartridge-receiving slot for cooperating with a pinch roller in a cartridge inserted into said cartridge-receiving slot to drive the tape in the cartridge past said transducer head; and an improved cartridge-retaining mechanism mounted on said chassis for engaging a cartridge inserted into said cartridge-receiving slot and urging such cartridge forwardly to press the pinch roller and the tape therein against said drive capstan; said improved retaining mechanism comprising:

a shaft rotatably mounted on said chassis beneath said flat plate;

a cartridge-retaining finger mounted on said shaft and extending radially outwardly therefrom;

a connecting flange mounted on one end of said shaft;

an actuator arm connected to said flange and extending generally parallel to said shaft;

a spring member connected between said chassis and said actuator arm;

means defining an opening in said flat plate of said chassis;

said spring member normally biasing said shaft to an inactive position wherein said cartridge-retaining finger is disposed beneath said flat plate and said actuator arm is disposed above said flat plate within said cartridge-receiving slot;

said actuator arm being adapted to be engaged by a cartridge inserted into said cartridge-receiving slot to rotate said shaft and bring said cartridge-retaining finger forwardly and upwardly through said opening in said flat plate to engage an abutment on the underside of the cartridge, whereupon said spring member will urge said shaft to a cartridge-retaining position wherein said cartridge-retaining finger urges the cartridge forwardly in the cartridge-receiving slot towards the pinch roller and presses the tape therein against said drive capstan.

3. An improved tape deck, comprising:

a chassis, including a generally flat surface;

upstanding guide flange means mounted on said flat surface and defining a cartridge-receiving slot;

a drive capstan mounted on said chassis adjacent to said cartridge-receiving slot;

an improved cartridge-retaining mechanism for engaging a tape cartridge having a pinch roller therein and urging the cartridge toward said drive capstan to press the pinch roller thereagainst;

said improved cartridge-retaining mechanism comprising:

a lever arm pivotably mounted on said chassis;

a cartridge-retaining member mounted on said lever arm for engaging a cartridge inserted into said cartridge-receiving slot and urging it toward said drive capstan; said cartridge retaining member comprising an upstanding flange on said lever arm;

an actuator member mounted on said lever arm in spaced relationship to said cartridge-retaining member, said actuator member being adapted to be engaged and moved by a cartridge inserted into said cartridge-receiving slot; said actuating member comprising an upstanding flange mounted on said lever arm in a fixed, spaced relationship to said cartridge-retaining member;

a spring member connected between said lever arm and said chassis; said spring member normally biasing said lever arm to an inactive position wherein said cartridge retaining member is disposed outside of said cartridge-receiving slot; said resilient means being operative, in response to insertion of a cartridge into said cartridge-receiving slot, to move said lever arm toward said drive capstan; and cam means operatively associated with said lever arm and said spring member for causing said lever arm to move upwardly when it is moved toward said drive capstan by said spring member to bring said cartridge-retaining member into said cartridge-receiving slot and into engagement with a cartridge therein, and for causing said lever arm to move downwardly and out of said cartridge-receiving slot when said lever arm is biased to its said inactive position by said spring member.